(12) United States Patent
Eda et al.

(10) Patent No.: US 9,003,834 B2
(45) Date of Patent: *Apr. 14, 2015

(54) GLASS SUBSTRATE FOR MAGNETIC DISK AND MANUFACTURING METHOD THEREOF

(75) Inventors: Shinji Eda, Nirasaki (JP); Hideki Isono, Kofu (JP)

(73) Assignee: Hoya Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/979,171

(22) Filed: Dec. 27, 2010

(65) Prior Publication Data

US 2011/0159320 A1    Jun. 30, 2011

(30) Foreign Application Priority Data

Dec. 29, 2009   (JP) ................ 2009-299246

(51) Int. Cl.
*C03B 11/00* (2006.01)
*G11B 5/84* (2006.01)
*C03B 11/08* (2006.01)

(52) U.S. Cl.
CPC ............ *G11B 5/8404* (2013.01); *C03B 11/088* (2013.01)

(58) Field of Classification Search
CPC .......................... G11B 2220/20; G11B 5/8404
USPC ........ 65/29.1, 29.21, 33.1, 33.4, 33.9, 61, 66, 65/104, 17.1, 64, 127, 29.11, 29.14, 29.18, 65/158, 85, 208, 348, 21.2, 21, 345, 133, 65/30.13; 451/5, 56, 47, 51, 41, 44, 128, 451/259; 428/141, 848, 848.9, 848.96; 430/5; 264/2.5; 134/6; 501/70
See application file for complete search history.

(56) References Cited

U.S. PATENT DOCUMENTS

| | | | | |
|---|---|---|---|---|
| 3,918,951 A * | 11/1975 | Kitayama et al. | ................ | 65/133 |
| 8,733,129 B2 * | 5/2014 | Eda et al. | .................... | 428/846.9 |
| 2002/0046577 A1 * | 4/2002 | Maeda et al. | ...................... | 65/85 |
| 2003/0121286 A1 * | 7/2003 | Takagi et al. | ...................... | 65/64 |
| 2003/0131628 A1 * | 7/2003 | Murakami et al. | ................. | 65/64 |
| 2004/0096705 A1 * | 5/2004 | Homola | ...................... | 428/848.9 |
| 2004/0113299 A1 * | 6/2004 | Hosoe | ............................ | 264/2.5 |
| 2004/0194506 A1 * | 10/2004 | Ueda et al. | .................... | 65/29.11 |
| 2004/0194508 A1 * | 10/2004 | Nishimoto et al. | ............. | 65/33.1 |
| 2005/0008822 A1 * | 1/2005 | Miyamoto et al. | ............. | 428/141 |
| 2005/0204777 A1 | 9/2005 | Mori et al. | | |
| 2005/0210923 A1 * | 9/2005 | Yamashita et al. | ................. | 65/64 |
| 2006/0172663 A1 * | 8/2006 | Zhang | ............................... | 451/5 |
| 2007/0044515 A1 * | 3/2007 | Pfeiffer | ............................. | 65/66 |
| 2007/0254191 A1 * | 11/2007 | Machida et al. | ................ | 65/17.1 |
| 2007/0295030 A1 * | 12/2007 | Nakamura et al. | ............ | 65/29.16 |
| 2008/0104996 A1 | 5/2008 | Minazawa | | |
| 2008/0138721 A1 * | 6/2008 | Hiramoto et al. | .................. | 430/5 |
| 2008/0187737 A1 * | 8/2008 | Fujiwara et al. | ................ | 501/47 |
| 2008/0188165 A1 * | 8/2008 | Sakaguchi et al. | ............ | 451/259 |
| 2008/0223402 A1 * | 9/2008 | Haneda et al. | ...................... | 134/6 |
| 2008/0233841 A1 * | 9/2008 | Haneda et al. | .................. | 451/54 |
| 2008/0241603 A1 * | 10/2008 | Isono | ......................... | 428/846.9 |
| 2009/0111360 A1 * | 4/2009 | Miyamoto | ...................... | 451/44 |
| 2009/0252993 A1 * | 10/2009 | Kawai et al. | .................. | 65/30.13 |

FOREIGN PATENT DOCUMENTS

| | | | |
|---|---|---|---|
| JP | 63248727 | A | 10/1988 |
| JP | 01133948 | A | 5/1989 |
| JP | 01164738 | A | 6/1989 |
| JP | 1994171959 | A | 6/1994 |
| JP | 10011748 | A | 1/1998 |
| JP | H11228150 | A | 8/1999 |
| JP | 2002097037 | A | 4/2002 |
| JP | 2003030822 | A | 1/2003 |
| JP | 2003054965 | A | 2/2003 |
| JP | 2003128425 | A | 5/2003 |
| JP | 2004196651 | A | 7/2004 |
| JP | 3709033 | B2 | 8/2005 |
| JP | 2005263574 | A | 9/2005 |
| JP | 2008105894 | A | 5/2008 |
| JP | 2008174401 | A | 7/2008 |
| JP | 2008254166 | A | 10/2008 |
| JP | 2008273779 | A | 11/2008 |
| JP | 2009099249 | A | 5/2009 |
| JP | 2009211782 | A | 9/2009 |
| JP | 2009269762 | A | 11/2009 |

OTHER PUBLICATIONS

Translation of Canon, JP 01133948, May 1989.*
International Search Report of corresponding International Application No. PCT/JP2010/007533, dated Feb. 1, 2011.

* cited by examiner

Primary Examiner — Kevin M Bernatz
Assistant Examiner — Louis Falasco
(74) *Attorney, Agent, or Firm* — Global IP Counselors, LLP

(57) ABSTRACT

The present invention provides a glass substrate for magnetic disk in which surface irregularity of a principal surface is suppressed and a method for efficiently manufacturing a glass substrate for magnetic disk. The method includes the steps of: forming a sheet glass material by performing press forming to molten glass, a principal surface of the sheet glass material having target flatness for the glass substrate for magnetic disk, the sheet glass material having a surface shape to be ground using a grinding abrasive grain; grinding the sheet glass material using a fixed abrasive grain; and polishing the sheet glass material using a loose abrasive grain, the sheet glass material having surface irregularity of the principal surface ground using the fixed abrasive grain.

19 Claims, 10 Drawing Sheets

HEAVE (FLATNESS)
  WAVINESS
  MICROWAVINESS
  ROUGHNESS
$\begin{pmatrix}\text{ARITHMETIC AVERAGE}\\\text{ROUGHNESS Ra}\end{pmatrix}$

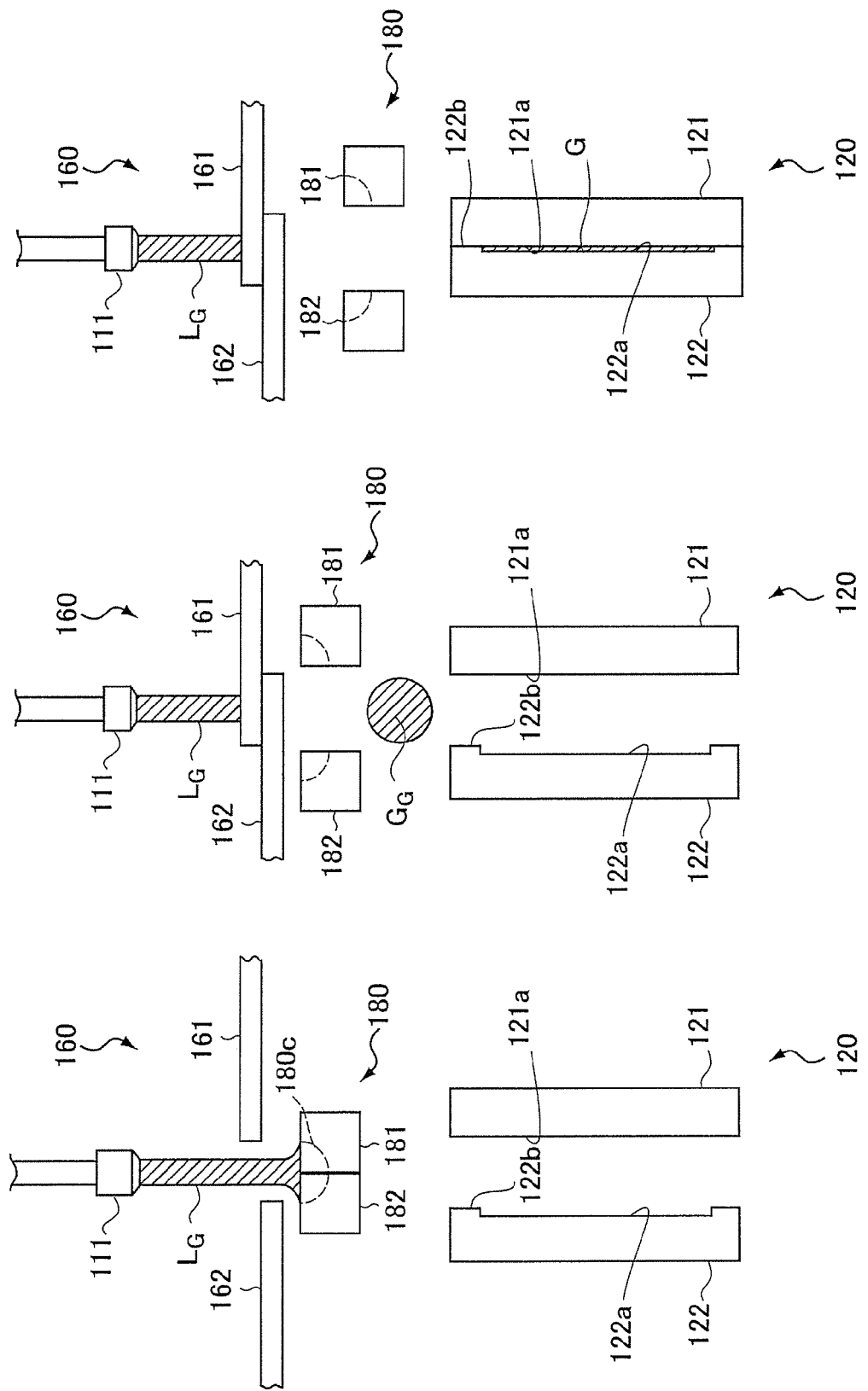

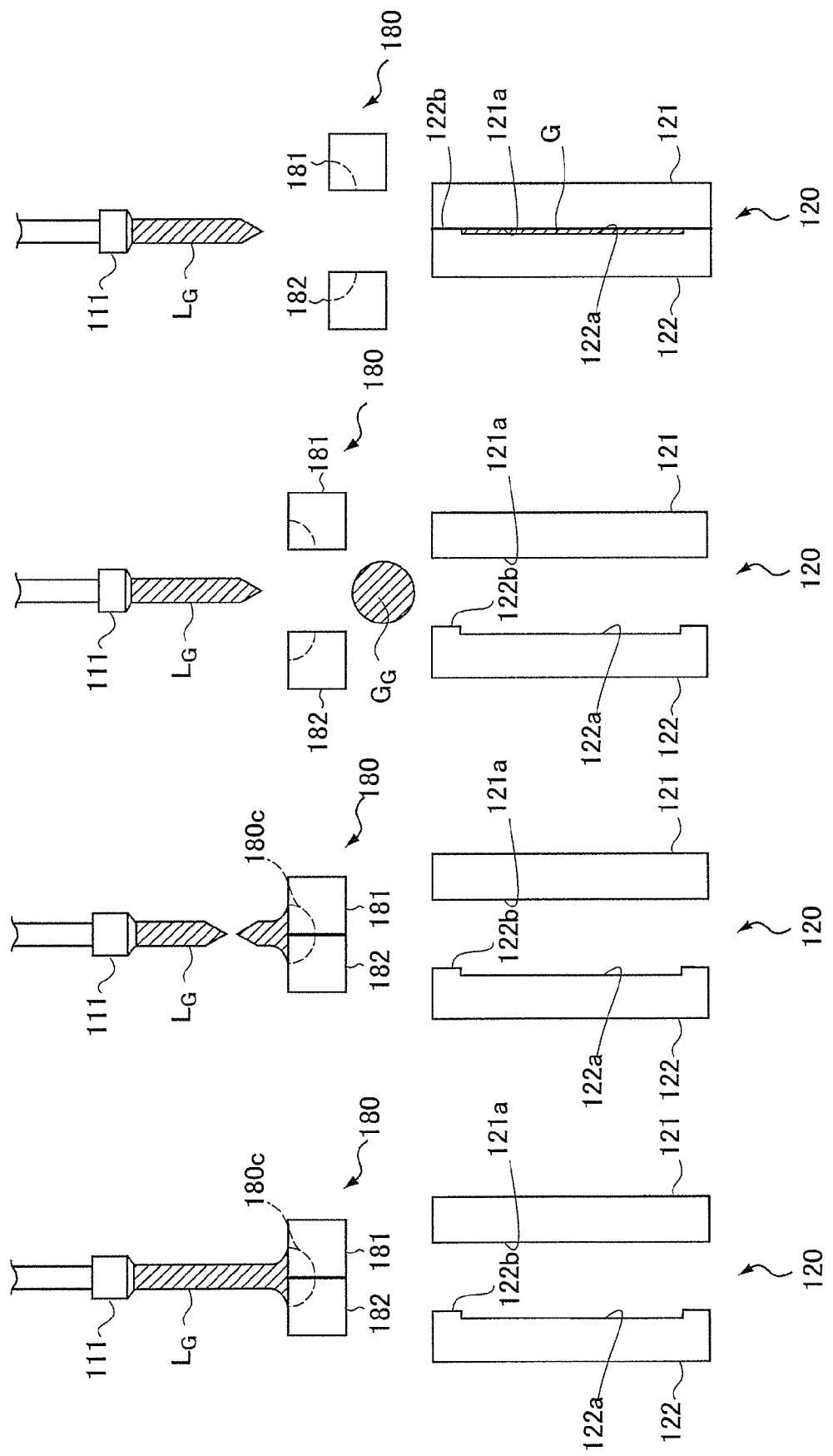

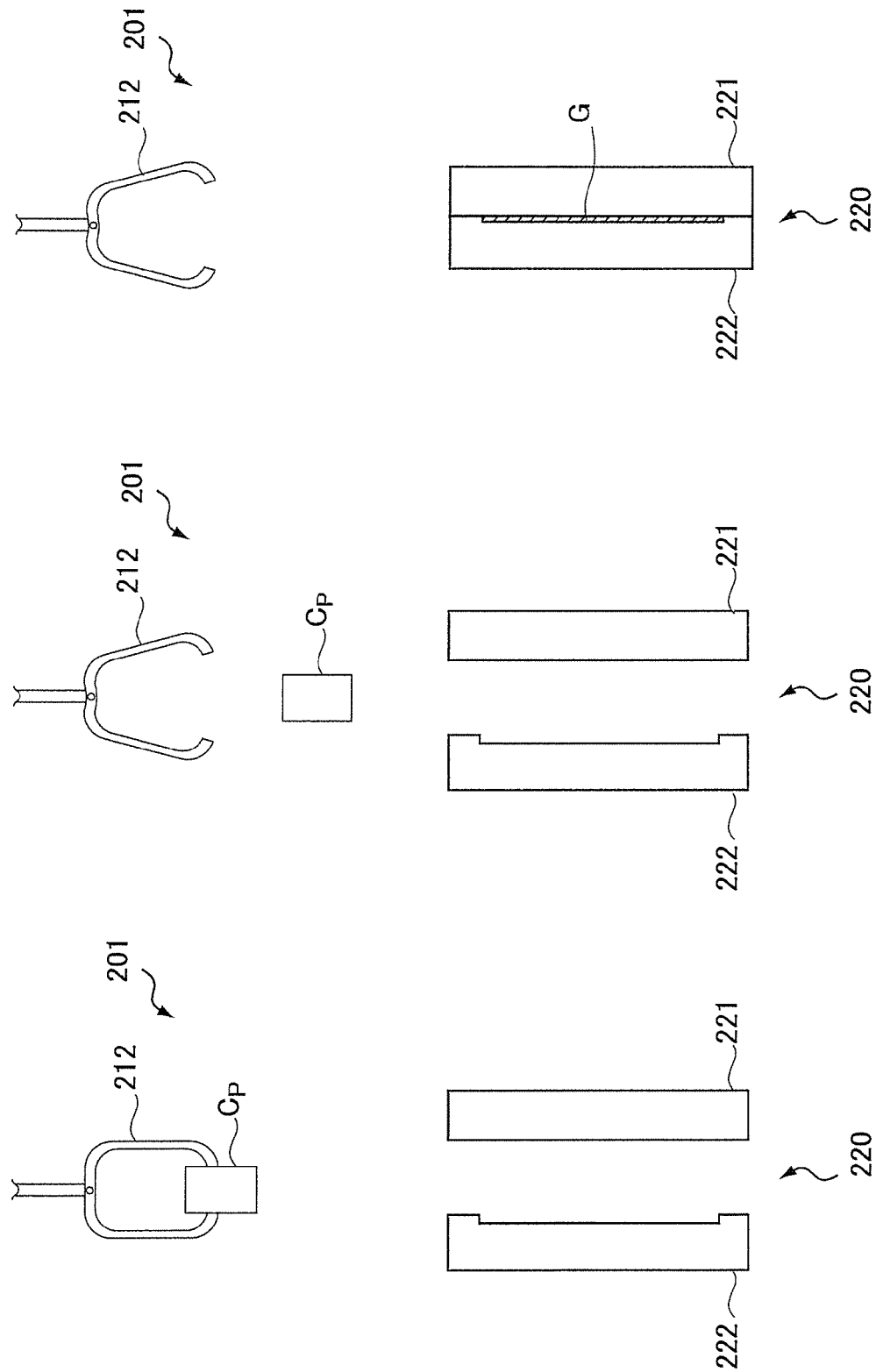

GLASS SUBSTRATE FOR MAGNETIC DISK AND MANUFACTURING METHOD THEREOF

CROSS-REFERENCE TO RELATED APPLICATION

This application is based upon and claims the benefit of priority of the prior Japanese Patent Application No. 2009-299246, filed on Dec. 29, 2009, the entire contents of which are incorporated herein by reference.

FIELD

The present invention relates to a glass substrate for magnetic disk having a pair of principal surfaces and a manufacturing method thereof.

BACKGROUND

Recently, a hard disk device is incorporated in a personal computer, a notebook personal computer, and a DVD (Digital Versatile Disc) recording apparatus in order to record data. Particularly, in the hard disk device used in an apparatus such as the notebook personal computer based on portability, a magnetic disk in which a magnetic layer is provided on a glass substrate is used, and magnetic recording information is recorded in or read from a magnetic layer using a magnetic head (DFH (Dynamic Flying Height) head) that is slightly floated on a surface of the magnetic disk surface. A glass substrate is suitably used as the substrate for the magnetic disk because substrate is hardly plastically deformed compared with a metallic substrate.

The magnetic recording density is being increased in order to correspond to a demand for an increase of a storage capacity in the hard disk device. For example, a magnetic recording information area is finely formed using a perpendicular magnetic recording system in which a magnetization direction of the magnetic layer is oriented toward a direction perpendicular to the substrate surface, which allows the storage capacity to be increased in one disk substrate. In order to correspond to the further increase of the storage capacity, a floating distance of the magnetic head from the magnetic recording surface is extremely shortened to form the fine magnetic recording information area. In the substrate of the magnetic disk, the magnetic layer is formed flat such that the magnetization direction of the magnetic layer is oriented toward the direction substantially perpendicular to the substrate surface. Therefore, the glass substrate is formed such that surface irregularity of the glass substrate is decreased as much as possible.

The shortened floating distance of the magnetic head may easily cause a head crush trouble or a thermal asperity trouble. Because these troubles are generated by the micro irregularity or a particle on the magnetic disk surface, the glass substrate is formed such that the surface irregularity in an end face is also decreased as much as possible in addition to the principal surface.

For example, the glass substrate used in the magnetic disk is manufactured by the following method: a glass gob made of molten glass is supplied onto a lower die that is a backing gob forming die; press forming is performed to the glass gob to prepare a sheet glass material using the lower die and an upper die that is a counter gob forming die; and the sheet glass material is formed into am information recording medium glass substrate (for example, see Japanese Patent No. 3709033).

In the method disclosed in Japanese Patent No. 3709033, after the glass gob made of the molten glass is supplied onto the lower die, the following steps are performed: a lower surface of a body for upper die and an upper surface of a body for lower die are abutted on together; a thin sheet glass forming space is formed outside a sliding surface between the upper die and the body for upper die and a sliding surface between the lower die and the body for lower die; the upper die is moved down to perform the press forming; and the upper die is moved up immediately after the press forming. Therefore, the sheet glass material that becomes a base of the glass substrate for magnetic disk is formed. Then, the glass substrate for magnetic disk is obtained through a grinding process and a polishing process.

In the grinding process, for example, grinding is performed using an alumina loose abrasive grain. In the grinding process, a first grinding process and a second grinding process are performed using the loose abrasive grains having different particle sizes. A particle size of the loose abrasive grain used in the second grinding process is set smaller than that of the loose abrasive grain used in the first grinding process. Therefore, the coarse grinding and the fine grinding are performed in this order.

The polishing process includes a first polishing process in which the loose abrasive grain such as a cerium oxide and a hard resin material polisher are used and a second polishing process in which colloidal silica and a soft resin material polisher are used. The particle size of the abrasive grain used in the first polishing process is smaller than that of the abrasive grain used in the second grinding process of the grinding process. The particle size of the abrasive grain used in the second polishing process is smaller than that of the abrasive grain used in the first polishing process.

Thus, in the surface processing of the glass substrate, the first grinding process, the second grinding process, the first polishing process, and the second polishing process are performed in this order, and the glass substrate is formed such that accuracy of surface quality such as surface roughness of the glass substrate is gradually enhanced.

However, the surface accuracy of the glass substrate formed by the conventional method is not enough for the surface accuracy of the principle surfaces for the high density of the magnetic recording and the fine magnetic recording information area.

For example, in forming the sheet glass material, a mold release agent is applied to the die surface in order to prevent the glass material from fusing to the die surfaces of the upper die and lower die. The surface roughness of the principal surface of the sheet glass material is increased because of the mold release agent. There is a large surface temperature difference between the upper die and the lower die, and the lower die to which the glass gob (a lump of the glass material) is supplied becomes high temperature. Because the surface temperature difference causes a temperature distribution in a thickness direction of the formed sheet glass material and in a plane of the plate, a shrinkage quantity of the sheet glass material that is taken out from the die and cooled also has a distribution in the thickness direction of the formed sheet glass material and in the plane of the plate. The sheet glass material is easy to warp, and therefore good flatness of the formed sheet glass material is not achieved.

The flatness of the sheet glass material can be improved by the grinding (first grinding process). For example, in the grinding process, a machining allowance (ground quantity) is increased in order to improve the flatness. However, when the machining allowance is increased in the grinding process, a deep crack may be generated in the surface of the sheet glass material. Therefore, in the polishing process that is a post-process, the machining allowance (polishing quantity) is also inevitably increased in an attempt to eliminate the deep crack. However, when the machining allowance is increased in the polishing process in which the loose abrasive grain and the resin polisher are used, the neighborhood in the outer circumferential edge portion is rounded in the principal surface of the sheet glass material to cause a "roll-off problem" of the edge portion. That is, because the neighborhood in the outer circumferential edge portion is rounded in the sheet glass material, a distance between the magnetic layer and the magnetic head in the neighborhood of the outer circumferential edge portion becomes larger than the floating distance of the magnetic head in another portion of the glass substrate when the magnetic disk is prepared using the sheet glass material as the glass substrate. The surface irregularity is generated because the neighborhood of the outer circumferential edge portion has the rounded shape. As a result, the recording and reading operations of the magnetic head are not precisely performed in the magnetic layer in the neighborhood of the outer circumferential edge portion. This is the "roll-off problem".

When the machining allowance is increased in the polishing process, a time necessary for the polishing process is unfavorably lengthened.

SUMMARY OF THE INVENTION

An object of the present invention is to provide a glass substrate for magnetic disk in which the surface irregularity of the principal surface is suppressed and a method for efficiently manufacturing the glass substrate for magnetic disk.

According to a first aspect of the invention, there is provided a manufacturing method of glass substrate for magnetic disk including a pair of principal surfaces, the method including the steps of: forming a sheet glass material by performing press forming to molten glass, a principal surface of the sheet glass material having target flatness for the glass substrate for magnetic disk, the sheet glass material having a surface shape to be ground using a grinding abrasive grain; grinding the sheet glass material using a fixed abrasive grain; and polishing the sheet glass material using a loose abrasive grain, the sheet glass material having surface irregularity of the principal surface ground using the fixed abrasive grain.

According to a second aspect of the invention, there is provided a manufacturing method of glass substrate for magnetic disk including a pair of principal surfaces, the method including the steps of: forming a sheet glass material by performing press forming to molten glass, a principal surface of the sheet glass material having target flatness for the glass substrate for magnetic disk, the sheet glass material having surface irregularity in which roughness of the principal surface ranges from 0.01 µm to 10 µm and an optical property in which a haze rate is 20% or more; grinding the sheet glass material having the surface irregularity and the optical property using a fixed abrasive grain; and polishing the sheet glass material using a loose abrasive grain, the sheet glass material having the surface irregularity of the principal surface ground using the fixed abrasive grain.

As used herein, "having the target flatness in the glass substrate for magnetic disk" means that the flatness of the principal surface already satisfies the surface accuracy of the principal surface, which should have as the glass substrate for magnetic disk, at the time the press forming is performed to the sheet glass material. That is, in the step of forming the sheet glass material, the target flatness of the principal surface is set in the glass substrate for magnetic disk, and the press forming is performed based on the target flatness, thereby implementing the glass material in which the principal surface has the target flatness.

The sheet glass material is formed by performing the press forming to the molten glass. The principal surface of the sheet glass material has the target flatness in the glass substrate for magnetic disk, and the sheet glass material has the surface irregularity in which the roughness of the principal surface ranges from 0.01 µm to 10 µm and the optical property in which the haze rate is 20% or more. Therefore, the glass substrate for magnetic disk can be manufactured through the grinding performed using the fixed abrasive grain and the polishing performed using the loose abrasive grain. The grinding is not performed at two stages using the loose abrasive grain unlike the conventional technique, so that the glass substrate for magnetic disk can efficiently be manufactured.

Preferably the step of forming the sheet glass material includes the steps of: causing the molten glass to fall as a lump; and forming the sheet glass material by performing the press forming to the lump while sandwiching the lump between surfaces of a pair of dies from both sides of a falling path of the lump, the dies being set to substantially identical temperature. The sheet glass material can be prepared by the press forming. The principal surface of the sheet glass material has the target flatness in the glass substrate for magnetic disk, and the sheet glass material has the surface irregularity in which the roughness of the principal surface ranges from 0.01 µm to 10 µm and the optical property in which the haze rate is 20% or more.

Preferably the pair of dies is opened immediately after the press forming is performed to the lump while the lump is sandwiched between the surfaces of the pair of dies in the step of forming the sheet glass material. In the conventional press forming, in order to prepare the sheet glass material having the high flatness, it is necessary that the flatness be enhanced by keeping the pressure for a constant time without releasing the die after the press forming. On the other hand, in the forming method in accordance with the first and second aspects of the invention, the sheet glass material having the high flatness can be formed even if the die is released immediately after the press forming.

Preferably the sheet glass material is formed thicker than a target thickness of the glass substrate for magnetic disk by 10 µm to 150 µm, and the sheet glass material is processed to the target thickness by the grinding step and the polishing step.

Preferably the grinding is performed using a diamond sheet in which diamond particles are provided in the grinding step.

Preferably the manufacturing method of glass substrate for magnetic disk in accordance with the first and second aspects of the invention further includes the step of scribing the sheet glass material between the step of forming the sheet glass material and the grinding step.

At this point, preferably the principal surface of the sheet glass material has the roughness of 0.01 µm to 1.0 µm.

For example, the target flatness is 4 µm or less.

According to a third aspect of the invention, there is provided the glass substrate for magnetic disk manufactured by the manufacturing method in accordance with the first and second aspects of the invention, wherein the glass substrate for magnetic disk has the surface irregularity in which the principal surface has the flatness of 4 µm or less and the principal surface has the roughness of 0.2 nm or less.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Referring now to the attached drawings which form a part of this original disclosure:

FIG. 6A to FIG. 6C are views illustrating another example of the press forming in FIG. 3;

FIG. 7A to FIG. 7D are views illustrating still another example of the press forming in FIG. 3;

FIG. 8A to FIG. 8C are views illustrating still another example of the press forming in FIG. 3;

DESCRIPTION OF THE PREFERRED EMBODIMENTS

A manufacturing method of glass substrate for magnetic disk and a glass substrate for magnetic disk according to an embodiment of the present invention will be described in detail below.

Figure 1A:
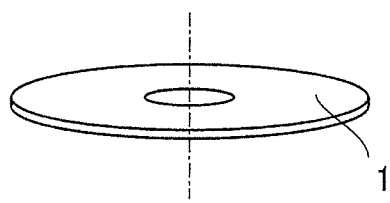
FIG. 1A to FIG. 1C are views illustrating a magnetic disk prepared using a glass substrate for magnetic disk according to an embodiment of the invention.
Figure 1B:
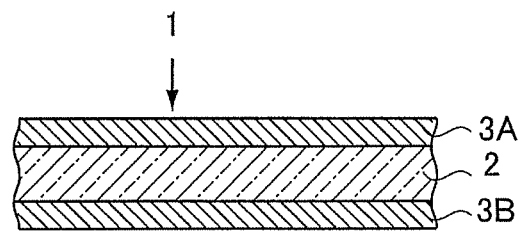
Figure 1C:
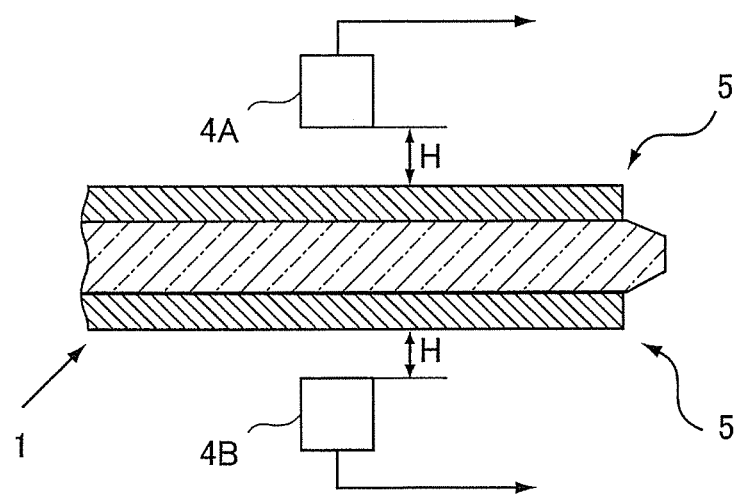
Figure 2A:
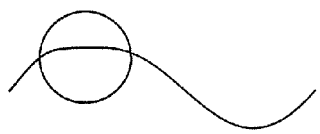
FIG. 2A to FIG. 2D are views illustrating surface irregularity in a sheet glass material or a glass substrate.
Figure 2B:
Figure 2C:
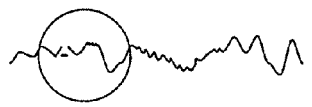
Figure 2D:

FIG. 1A to FIG. 1C are views illustrating a magnetic disk that is prepared using a glass substrate for magnetic disk of the embodiment of the invention.

(Magnetic Disk and Glass Substrate for Magnetic Disk)

In a magnetic disk 1 of FIG. 1A used in a hard disk device, layers 3A and 3B including at least magnetic layers (perpendicular magnetic recording layers) are formed in principal surfaces of a ring glass substrate 2 as illustrated in FIG. 1B. More specifically, although not illustrated in FIG. 1, each of the layers 3A and 3B includes an adhesive layer, a soft magnetic layer, a non-magnetic underlying layer, the perpendicular magnetic recording layer, a protective layer, and a lubricant layer. For example, a Cr alloy is used in the adhesive layer, and the adhesive layer acts as a bonding layer to the glass substrate 2. For example, a CoTaZr alloy is used as the soft magnetic layer, a granular non-magnetic layer is used as the non-magnetic underlying layer, and a granular magnetic layer is used as the perpendicular magnetic recording layer. For example, a material containing carbon hydride is used as the protective layer, and a fluorine resin is used as the lubricant layer.

The magnetic disk 1 will be described with a more specific example. A CrTi adhesive layer, a CoTaZr/Ru/CoTaZr soft magnetic layer, a CoCrSiO$_2$ granular non-magnetic underlying layer, a CoCrPt—SiO$_2$.TiO$_2$ granular magnetic layer, and a carbon hydride protective layer are sequentially deposited in both the principal surfaces of the glass substrate 2 with an in-line type sputtering apparatus. A perfluoropolyether lubricant layer is deposited on the deposited uppermost layer by a dipping method.

As illustrated in FIG. 1C, magnetic heads 4A and 4B of a hard disk device float from surfaces of the magnetic disk 1 by 5 nm in the condition of high-speed rotation, for example, 7200 rpm, of the magnetic disk 1. That is, a distance H in FIG. 1C is 5 nm. At this point, the magnetic heads 4A and 4B record and read pieces of information in and from the magnetic layers. The floating of the magnetic heads 4A and 4B can closely record and read the information in and from the magnetic layer of the magnetic disk 1 without sliding the magnetic heads 4A and 4B onto the magnetic layer, thereby realizing a fine magnetic recording information area and high density of the magnetic recording.

A central portion of the glass substrate 2 of the magnetic disk 1 to an outer circumferential edge portion 5 are precisely processed with target surface accuracy, and the magnetic heads 4A and 4B can precisely operated while the distance H of 5 nm is maintained.

Surface irregularity of the glass substrate 2 is processed by grinding using a fixed abrasive grain having a small machining allowance, and subsequently processed by first polishing and second polishing, in which the machining allowance can be decreased as a result of the grinding. Accordingly, the conventional "roll-off problem" is resolved.

For example, the principal surface of the glass substrate 2 used in the magnetic disk 1 has surface irregularity in which flatness is 4 μm or less and surface roughness is 0.2 nm or less. The flatness of 4 μm or less is target flatness required for the glass substrate for magnetic disk as a final product. For example, the flatness can be measured with a flatness tester FT-900 manufactured by NIDEK CO., LTD. The roughness of the principal surface is expressed by arithmetic average roughness Ra defined by JIS B0601:2001. When the roughness ranges from 0.006 μm to 200 μm, for example, the roughness is measured with a roughness measuring machine SV-3100 manufactured by Mitutoyo Corporation, and the roughness can be computed by a method defined by JIS B0633:2001. As a result of the measurement, when the roughness is 0.03 μm or less, for example, the roughness is measured with a scanning probe microscope (atomic force microscope) manufactured by SII Nano Technology Inc, and the roughness can be computed by a method defined by JIS R1683:2007.

In the embodiment, the surface roughness of the sheet glass material is measured with the roughness measuring machine SV-3100 manufactured by Mitutoyo Corporation, and the surface roughness of the glass substrate of the post-polishing is measured with the scanning probe microscope (atomic force microscope).

FIG. 2A to FIG. 2D are views illustrating the surface irregularity. The surface irregularity can be classified into four irregularities according to a wavelength of the irregularity.

Specifically, the surface irregularity is classified into heave having the largest wavelength (wavelength of about 0.6 μm to about 130 mm), waviness (wavelength of about 0.2 to about 2 mm), micro-waviness (wavelength of 0.1 μm to 1 mm), and roughness (wavelength of 10 nm or less).

The heave can be expressed by the flatness as an index, and the roughness can be expressed by the arithmetic average roughness Ra as an index.

The glass substrate for magnetic disk having the surface irregularity, in which the flatness is 4 μm or less and the surface roughness is 0.2 nm or less, can be obtained through a grinding process, a first polishing process, and a second polishing process after press forming.

On the other hand, the surface irregularity of the sheet glass material is not included in the above range immediately after the press forming. However, the sheet glass material has the following property: the principal surface has the roughness of 0.01 μm to 10 μm; the target flatness of the principal surface necessary as the glass substrate for magnetic disk, specifically the flatness of the principal surface is 4 μm or less; and the principal surface has the roughness of 0.01 μm to 10 μm. Additionally, the sheet glass material has an optical property in which a haze rate defined by JIS K7105 and JIS K7136 is 20% or more. The reason the surface flatness of the sheet glass material is set to the target flatness of the principal surface necessary as the glass substrate for magnetic disk is that the flatness of the glass substrate 2 used in the magnetic disk 1 is maintained without performing the conventional first grinding process of adjusting the flatness and plate thickness, and that the recording and reading operations of the magnetic heads 4A and 4B can properly be performed. For example, the sheet glass material that has the surface irregularity and optical property as the glass substrate for magnetic disk can be prepared by the press forming. The sheet glass material having the above property can be obtained with the later-described press forming. The sheet glass material having the flatness of 4 μm or less cannot be formed with the conventional press forming. The reason the sheet glass material has the optical property in which the haze rate is 20% or more is that the grinding is efficiently performed through the grinding process using the fixed abrasive grain.

The reason the surface roughness of the sheet glass material is set to 0.01 μm or more is that the grinding is efficiently performed to the sheet glass material using the fixed abrasive grain. The reason the surface roughness of the sheet glass material is set to 10 μm or less is that the increase of the machining allowance of the polishing performed to remove the deeply proceeding crack caused by the grinding is suppressed. The surface roughness of the principal surface of the glass blank is set to 10 μm or less, which allows the surface roughness Ra required as the glass substrate for magnetic disk to be securely adjusted. Preferably the surface roughness of the sheet glass material ranges from 0.01 μm to 1.0 μm in order to efficiently scribe the sheet glass material.

The surface irregularity of a sheet glass material G can be achieved by adjusting the surface roughness of the die in the press forming.

For example, aluminosilicate glass, soda-lime glass, and borosilicate glass can be used as a material for the glass substrate 2 of the magnetic disk 1. Particularly, the aluminosilicate glass can be suitably used in that chemically strengthening can be performed and in that the glass substrate for magnetic disk excellent for the flatness of the principal surface and the strength of the substrate can be prepared.

A chemically strengthened glass material mainly containing by molar percent of 57 to 74% $SiO_2$, 0 to 2.8% $ZnO_2$, 3 to 15% $Al_2O_3$, 7 to 16% $LiO_2$, and 4 to 14% $Na_2O$ is suitably used as the aluminosilicate glass.

(Manufacturing Method of Glass Substrate for Magnetic Disk)

Figure 3:
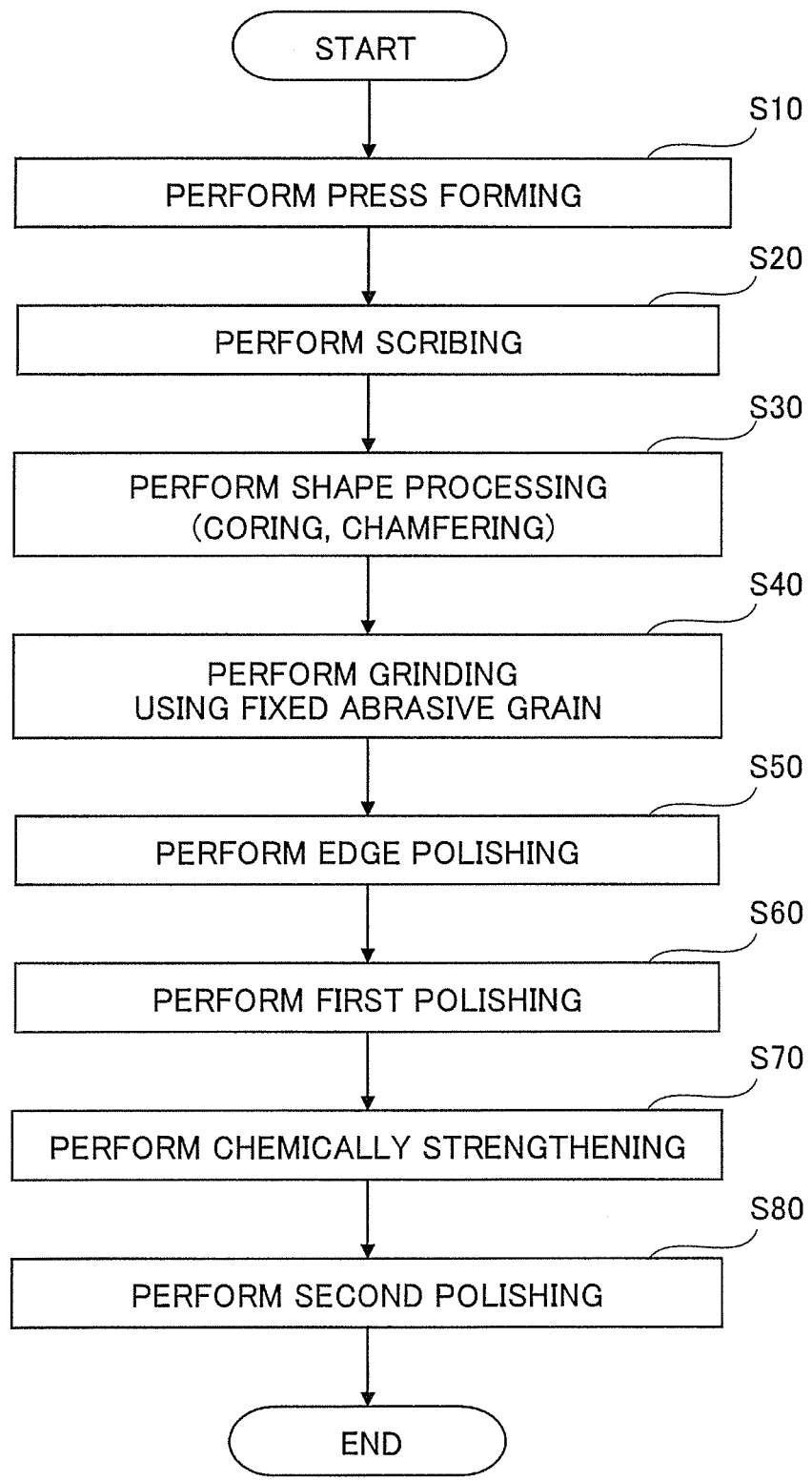
FIG. 3 is a view illustrating a flow of a manufacturing method of glass substrate for magnetic disk according to an embodiment of the invention.

FIG. 3 is a view illustrating a flow of a manufacturing method of glass substrate for magnetic disk of the embodiment. The sheet glass material is prepared by the press forming (Step S10). The prepared sheet glass material has the following property: the surface irregularity, in which the flatness of the principal surface, that is, the target flatness of the principal surface necessary as the glass substrate for magnetic disk is 4 μm or less; the roughness of the principal surface ranges from 0.01 μm to 10 μm; and the optical property in which the haze rate defined by is JIS K7105 and JIS K7136 is 20% or more.

Figure 4:
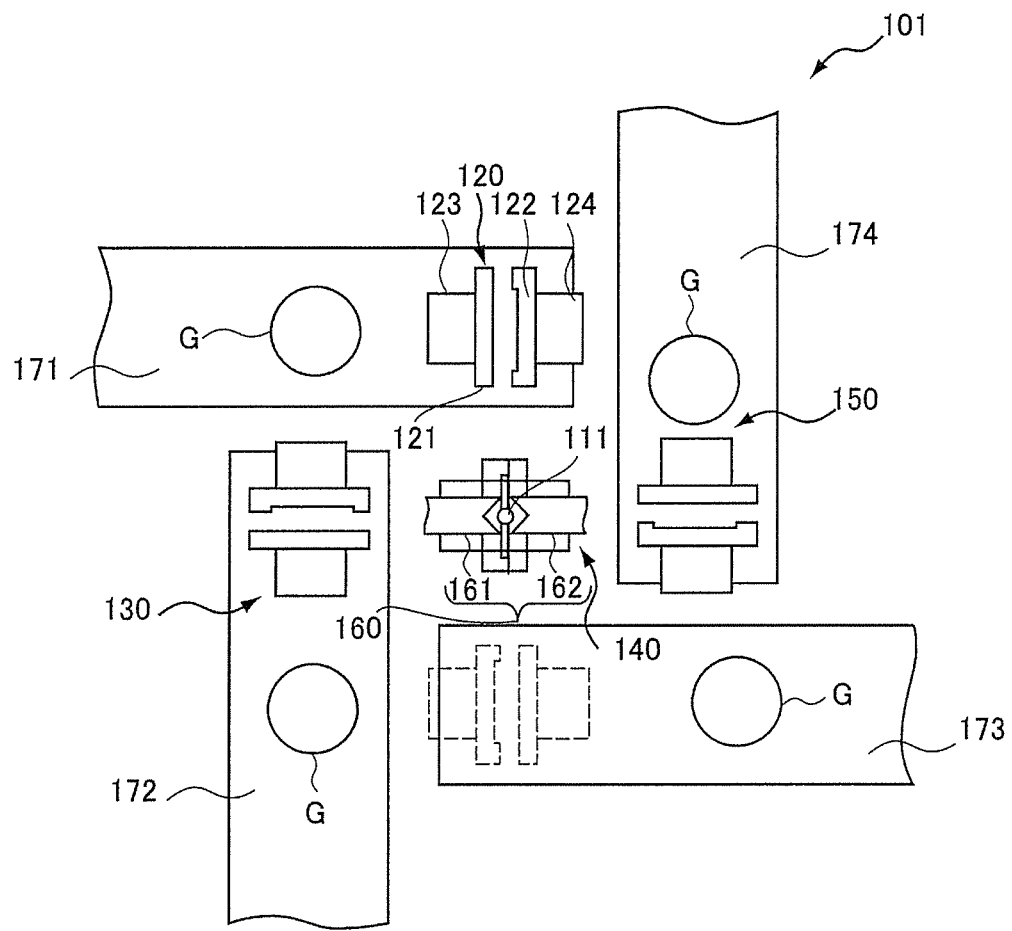
FIG. 4 is a plan view of an apparatus used in press forming in FIG. 3.

For example, the press forming is performed with an apparatus illustrated in FIG. 4 and FIG. 5. The press forming can also be performed with an apparatus illustrated in FIG. 6, FIG. 7, and FIG. 8. FIG. 4 is a plan view of an apparatus 101 used in the press forming, FIG. 5 to FIG. 8 are views illustrating a state in which the apparatus performs the press forming when viewed from a side face.

(a) Press Forming Process

An apparatus 101 illustrated in FIG. 4 includes four sets of press units 120, 130, 140, and 150 and a cutting unit 160. The cutting unit 160 is provided on a path of the molten glass that flows out from a molten glass outflow port 111. In the apparatus 101, a lump of the molten glass cut by the cutting unit 160 is caused to fall down, and the lump is pressed from both sides of the falling path of the lump while sandwiched between surfaces of a pair of dies set to the substantially same temperature, thereby forming the sheet glass material.

Specifically, as illustrated in FIG. 4, in the apparatus 101, the four sets of press units 120, 130, 140, and 150 are provided at intervals of 90 degrees around the molten glass outflow port 111.

As used herein, "the substantially same temperature" means that an absolute value of a temperature difference between a temperature at a press forming surface of first press forming die constituting the pair of dies and a temperature at a press forming surface of a second press forming die is 10° C. or less. More preferably the absolute value of the temperature difference is 5° C. or less, most preferably the absolute value of the temperature difference is 0° C. When a temperature distribution exists in the press forming surface, "the temperature at the press forming surface" means a temperature near a center portion of the press forming surface.

Preferably the lump is brought into contact with the surfaces of the pair of dies in substantially the same timing, and the press forming is performed while the lump is sandwiched between the surfaces of the pair of dies in the substantially same timing. "The lump is brought into contact with the surfaces of the pair of dies in substantially the same timing" means that the absolute value of the time difference between the time the molten glass lump comes into contact with one of the press forming surfaces and the time the molten glass lump comes into contact with the other press forming surface is 0.1 second or less. More preferably the absolute value of the time difference 0.05 second or less, most preferably the absolute value of the time difference is 0 second.

Each of the press units 120, 130, 140, and 150 is driven by a moving mechanism (not illustrated) so as to be able to proceed and retreat with respect to the molten glass outflow port 111. That is, each of the press units 120, 130, 140, and 150 can be moved between a catch position and a retreat position. The catch position (position in which the press unit 140 is drawn by a solid line in FIG. 4) is located immediately below the molten glass outflow port 111. The retreat position (positions in which the press units 120, 130, and 150 are drawn by solid lines in FIG. 4 and a position in which the press units 140 is drawn by a broken line in FIG. 4) is located away from the molten glass outflow port 111.

The cutting unit 160 is provided on a path of the molten glass between the catch position and the molten glass outflow port 111. The cutting unit 160 forms the lump (hereinafter also referred to as "gob") of the molten glass by cutting a proper quantity of the molten glass flowing out from the molten glass outflow port 111. The cutting unit 160 includes a pair of cutting blades 161 and 162. The cutting blades 161 and 162 are driven so as to intersect each other on the path of the molten glass at constant timing. When the cutting blades 161 and 162 intersect each other, the molten glass is cut to obtain the gob. The obtained gob falls down toward the catch position.

The press unit 120 includes a first die 121, a second die 122, a first driving unit 123, and a second driving unit 124. Each of the first die 121 and the second die 122 is a plate-shaped member including a surface used to perform the press forming for the gob. The first die 121 and the second die 122 are disposed such that normal directions of the surfaces become substantially horizontal, and such that the surfaces become parallel to each other. The first driving unit 123 causes the first die 121 to proceed and retreat with respect to the second die 122. On the other hand, the second driving unit 124 causes the second die 122 to proceed and retreat with respect to the first die 121. Each of the first driving unit 123 and the second driving unit 124 includes a mechanism for causing the surface of the first driving unit 123 and the surface of the second driving unit 124 to be rapidly brought close to each other, for example, a mechanism in which an air cylinder or a solenoid and a coil spring are combined.

Because the structures of the press units 130, 140, and 150 are similar to that of the press unit 120, the descriptions of the press units 130, 140, and 150 are omitted.

After each press unit moves to the catch position, the falling gob is sandwiched between the first die and the second die by driving the first driving unit and the second driving unit, and the gob is formed into a predetermined thickness while rapidly cooled, thereby preparing the disk-shaped sheet glass material G. Then, after the press unit moves to the retreat position, the first die and the second die are separated to cause the formed sheet glass material G to fall down. A first conveyer 171, a second conveyer 172, a third conveyer 173, and a fourth conveyer 174 are provided below the retreat positions of the press units 120, 130, 140, and 150, respectively. Each of the first to fourth conveyers 171 to 174 receive the sheet glass material G falling down from the corresponding press unit, and the conveyer conveys the sheet glass material G to an apparatus (not illustrated) of the next process.

The apparatus 101 is configured such that the press units 120, 130, 140, and 150 sequentially move to the catch position and move to the retreat position while the gob is sandwiched, so that the sheet glass material G can continuously be formed without waiting for the cooling of the sheet glass material G in each press unit.

Figure 5A:
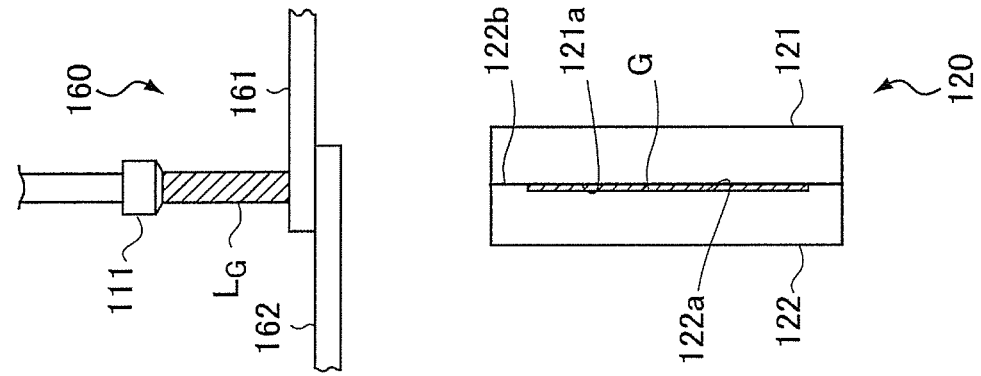
FIG. 5A to FIG. 5C are views illustrating an example of the press forming performed by the apparatus of FIG. 4.
Figure 5B:
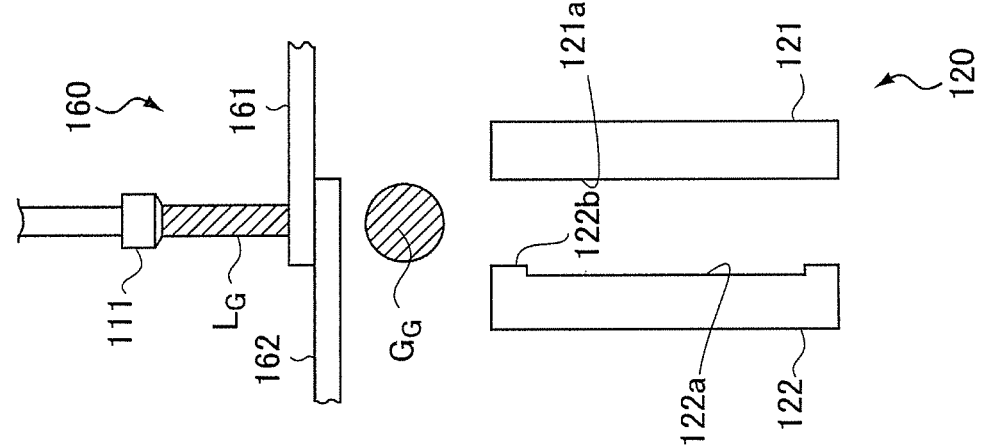
Figure 5C:
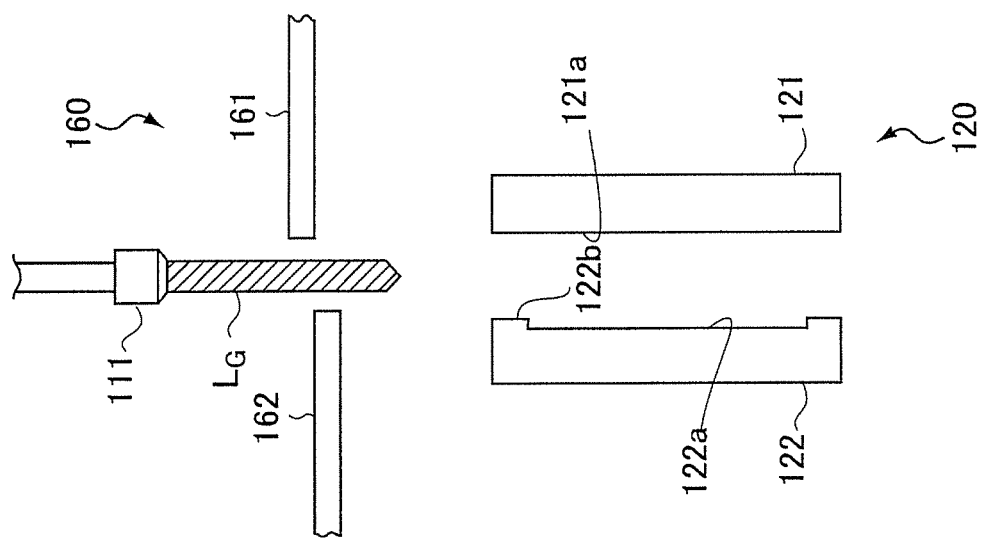

FIG. 5A to FIG. 5C more specifically illustrate the press forming performed by the apparatus 101. FIG. 5A is a view illustrating the state before the gob is made, FIG. 5B is a view illustrating the state in which the gob is made by the cutting unit 160, and FIG. 5C is a view illustrating the state in which the sheet glass material G is formed by pressing the gob.

As illustrated in FIG. 5A, a molten glass material $L_G$ continuously flows out from the molten glass outflow port 111. At this point, the cutting unit 160 is driven at predetermined timing to cut the molten glass material $L_G$ using the cutting blades 161 and 162 (FIG. 5B). Therefore, the cut molten glass becomes a substantially spherical gob $G_G$ due to a surface tension thereof. In the example illustrated in FIG. 5, an outflow quantity per time of the molten glass material $L_G$ and a driving interval of the cutting unit 160 are adjusted such that a gob $G_G$ having a radius of about 10 mm is formed every time the cutting unit 160 is driven.

The made gob $G_G$ falls down toward a gap between the first die 121 and second die 122 of the press unit 120. At this point, the first driving unit 123 and the second driving unit 124 (see FIG. 4) are driven such that the first die 121 and the second die 122 come close to each other at the timing the gob $G_G$ enters the gap between the first die 121 and the second die 122. Therefore, as illustrated in FIG. 5C, the gob $G_G$ is captured (caught) between the first die 121 and the second die 122. An inner circumferential surface 121a of the first die 121 and an inner circumferential surface 122a of the second die 122 come close to each other with a micro gap, and the gob $G_G$ sandwiched between the inner circumferential surface 121a of the first die 121 and the inner circumferential surface 122a of the second die 122 is formed into a thin-plate shape. A projected spacer 122b is provided in the inner circumferential surface 122a of the second die 122 in order to keep the gap between the inner circumferential surface 121a of the first die 121 and the inner circumferential surface 122a of the second die 122 constant. That is, the spacer 122b of the second die abuts on the inner circumferential surface 121a of the first die 121, whereby the gap between the inner circumferential surface 121a of the first die 121 and the inner circumferential surface 122a of the second die 122 is kept constant to generate a disk-shaped space.

A temperature control mechanism (not illustrated) is provided in each of the first die 121 and second die 122, and temperatures at the first die 121 and second die 122 is retained sufficiently lower than a glass transition temperature $T_G$ of the molten glass $L_G$.

A time until the gob $G_G$ is completely confined between the first die 121 and the second die 122 after the gob $G_G$ comes into contact with the inner circumferential surface 121a of the first die 121 or the inner circumferential surface 122a of the second die 122, is as extremely short as about 0.06 second in the apparatus 101. Therefore, the gob $G_G$ is formed into the substantially disk shape by spreading along the inner circumferential surface 121a of the first die 121 and the inner circumferential surface 122a of the second die 122 within an extremely short time, and the gob $G_G$ is rapidly cooled and solidified in the form of amorphous glass, thereby preparing the disk-shaped sheet glass material G. In the embodiment, for example, the sheet glass material G is a disk-shaped plate having a diameter of 75 to 80 mm and a thickness of about 1 mm.

After the first die 121 and the second die 122 are closed, the press unit 120 quickly moves to the retreat position, instead the press unit 130 moves to the catch position, and the press unit 130 performs the pressing to the gob $G_G$.

After the press unit 120 moves to the retreat position, the first die 121 and the second die 122 are kept closed until the sheet glass material G is sufficiently cooled (until the sheet glass material G becomes at least a temperature below a yield point). Then, the first driving unit 123 and the second driving unit 124 are driven to separate the first die 121 and the second die 122, the sheet glass material G falls down from the press unit 120, and the conveyer 171 located below the press unit 120 receives the sheet glass material G (see FIG. 4).

As described above, in the apparatus 101, the first die 121 and the second die 122 are closed within a time as extremely short as 0.1 second (about 0.06 second), and the molten glass substantially simultaneously comes into contact with the whole of the inner circumferential surface 121a of the first die 121 and the whole of the inner circumferential surface 122a of the second die 122. Therefore, the inner circumferential surface 121a of the first die 121 and the inner circumferential surface 122a of the second die 122 are not locally heated, and a deformation is hardly generated in the inner circumferential surface 121a and the inner circumferential surface 122a. Because the molten glass is formed into the disk shape before the heat transfers from the molten glass to the first die 121 and the second die 122, a temperature distribution of the formed molten glass becomes substantially even. Therefore, in cooling the molten glass, the shrinkage quantity of the glass material has the small distribution, and the large deformation is not generated in the sheet glass material G. Accordingly, the flatness of the principal surface of the prepared sheet glass material G is improved compared with the sheet glass material prepared by the conventional press forming, and the target flatness of the principal surface necessary as the glass substrate for magnetic disk can be realized.

The surface irregularities of the inner circumferential surface 121a of the first die 121 and the inner circumferential surface 122a of the second die 122 can be adjusted such that the optical property in which the haze rate is 20% or more in the formed sheet glass material G is obtained. The surface roughness of the inner circumferential surface 121a and the surface roughness of the inner circumferential surface 122a can be adjusted such that the arithmetic average roughness Ra of the sheet glass material G becomes 0.01 μm to 10 μm, preferably 0.01 μm to 1 μm.

In the example illustrated in FIG. 5, the substantially spherical gob $G_G$ is formed by cutting the flowing-out molten glass $L_G$ using the cutting blades 161 and 162. However, when viscosity of the molten glass material $L_G$ is small with respect to a volume of the gob $G_G$ to be cut, the glass does not become the substantially spherical shape only by cutting the molten glass $L_G$, and the gob is not formed. In such cases, a gob forming die is used to form the gob.

FIG. 6A to FIG. 6C are views illustrating a modification of the embodiment of FIG. 5. The gob forming die is used in the modification. FIG. 6A is a view illustrating the state before the gob is made, FIG. 6B is a view illustrating the state in which the gob $G_G$ is made by the cutting unit 160 and a gob forming die 180, and FIG. 6C is a view illustrating the state in which the press forming is performed to the gob $G_G$ to make the sheet glass material G.

As illustrated in FIG. 6A, the path of the molten glass $L_G$ to the press unit 120 is closed by closing the blocks 181 and 182, and the lump of the molten glass $L_G$ cut with the cutting unit 160 is received by a recess 180C formed by the block 181 and 182. Then, as illustrated in FIG. 6B, the molten glass $L_G$ that becomes the spherical shape in the recess 180C falls down toward the press unit 120 at one time by opening the blocks 181 and 182. When falling down toward the press unit 120, the gob $G_G$ becomes the spherical shape by the surface tension of the molten glass $L_G$. As illustrated in FIG. 6C, during the fall of the gob $G_G$, the spherical gob $G_G$ is sandwiched between the first die 121 and the second die 122 to perform the press forming, thereby preparing the disk-shaped sheet glass material G.

Alternatively, as illustrated in FIG. 7A to FIG. 7D, in the apparatus 101, instead of using the cutting unit 160 illustrated in FIG. 6A to FIG. 6C, a moving mechanism that moves the gob forming die 180 in an upstream direction or a downstream direction along the path of the molten glass $L_G$ may be used. FIG. 7A to FIG. 7D are views illustrating a modification in which the gob forming die 180 is used. FIGS. 7A and 7B are views illustrating the state before the gob $G_G$ is made, FIG. 7C is a view illustrating the state in which the gob $G_G$ is made by the gob forming die 180, and FIG. 7D is a view illustrating the state in which the press forming is performed to the gob $G_G$ to make the sheet glass material G.

As illustrated in FIG. 7A, the recess 180C formed by the block 181 and 182 receives the molten glass $L_G$ flowing out from the molten glass outflow port 111. As illustrated in FIG. 7B, the blocks 181 and 182 are quickly moved onto the downstream side of the flow of the molten glass $L_G$ at predetermined timing, thereby cutting the molten glass $L_G$. Then, as illustrated in FIG. 7C, the blocks 181 and 182 are separated at predetermined timing. Therefore, the molten glass $L_G$ retained by the blocks 181 and 182 falls down at one time, and the gob $G_G$ becomes the spherical shape by the surface tension of the molten glass $L_G$. As illustrated in FIG. 7D, during the fall of the spherical gob $G_G$, the spherical gob $G_G$ is sandwiched between the first die 121 and the second die 122 to perform the press forming, thereby preparing the disk-shaped sheet glass material G.

FIGS. 8A to 8C are views illustrating another modification in which, instead of the gob $G_G$, a lump $C_P$ of the optical glass heated by a softening furnace (not illustrated) is caused to fall down and the press forming is performed to the lump $C_P$ while the lump $C_P$ is sandwiched from both sides between dies 221 and 222 during the fall of the lump $C_P$. FIG. 8A is a view illustrating the state before the lump of the heated optical glass is formed, FIG. 8B is a view illustrating the state in which the lump of the optical glass falls down, and FIG. 8C is a view illustrating the state in which the press forming is performed to the lump of the optical glass to make the sheet glass material G.

As illustrated in FIG. 8A, in an apparatus 201, a glass material grasping mechanism 212 conveys the lump $C_p$ of the optical glass to a position above a press unit 220. As illustrated in FIG. 8B, the glass material grasping mechanism 212 releases the lump $C_P$ of the optical glass to cause the lump $C_p$ of the optical glass to fall down. As illustrated in FIG. 8C, during the fall of the lump $C_p$ of the optical glass, the lump $C_p$ is sandwiched between the first die 221 and the second die 222 to perform the press forming, thereby preparing the disk-shaped sheet glass material G. Because the first die 221 and the second die 222 have the same configuration and action as those of the first die 121 and second die 122 illustrated in FIG. 5, the descriptions are omitted.

(b) Scribing Process

After the press forming, scribing is performed to the formed sheet glass material G as illustrated in FIG. 3 (Step S20).

As used herein, the scribing means that two concentric (inside concentric and outside concentric) cutting-plane lines (scratch in the form of a line) are provided in the surface of the sheet glass material G with a scriber made of a super alloy or diamond particles in order to obtain the donut-shape (ring-shape) of the formed sheet glass material G having a predetermined size. The sheet glass material G scribed into two-concentric-circle shape is partially heated, and a portion outside the outside concentric circle and a portion inside the inside concentric circle are removed by a difference in thermal expansion of the sheet glass material G, thereby obtaining the donut-shaped sheet glass material.

As described above, the cutting-plane line can suitably be provided with the scriber, because the sheet glass material G produced through the (a) press forming process has the roughness of 0.01 μm or less. In the case in which the roughness of the sheet glass material exceeds 1 μm, the scriber does not precisely trace on the surface, and cutting-plane line may not be evenly provided. Even in such case, the sheet glass material may be prepared so as to have an outer diameter and circularity to an extent in which the scribing is not required, and a round hole is made in the sheet glass material with a core drill, thereby obtaining the ring sheet glass material.

(c) Shape processing Process (Chamfering Process)

Then shape processing is performed to the scribed sheet glass material G (Step S30). The shape processing includes chamfering (chamfering of outer circumferential end portion and inner circumferential end portion).

The outer circumferential end portion and inner circumferential end portion of the ring sheet glass material G are chamfered using a diamond abrasive grain.

(d) Grinding Process using Fixed Abrasive Grain

Then grinding is performed to the ring sheet glass material G using the fixed abrasive grain (Step S40). For example, the grinding using the fixed abrasive grain has the machining allowance of several micrometers to about 100 micrometers. For example, the fixed abrasive grain has the particle size of about 10 µm.

Figure 9A:
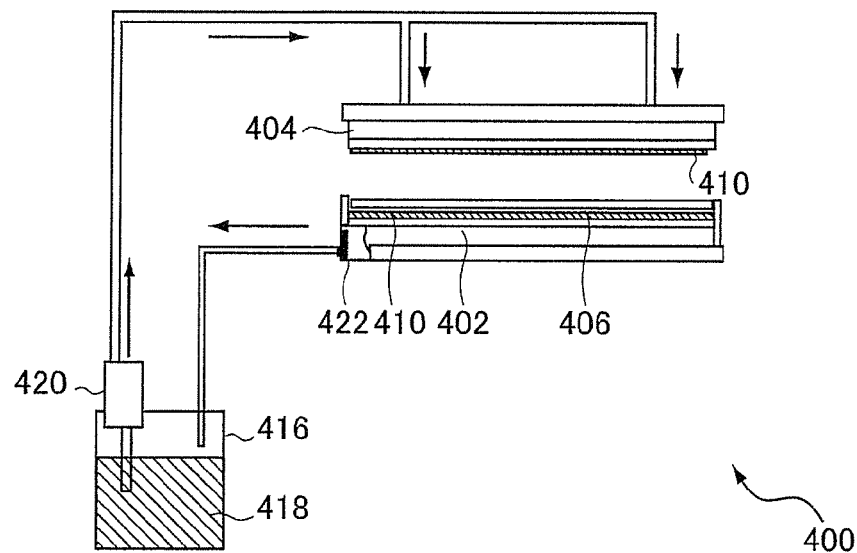
FIG. 9A is an overall view of an apparatus used to perform grinding using a fixed abrasive grain in FIG. 3.
Figure 9B:
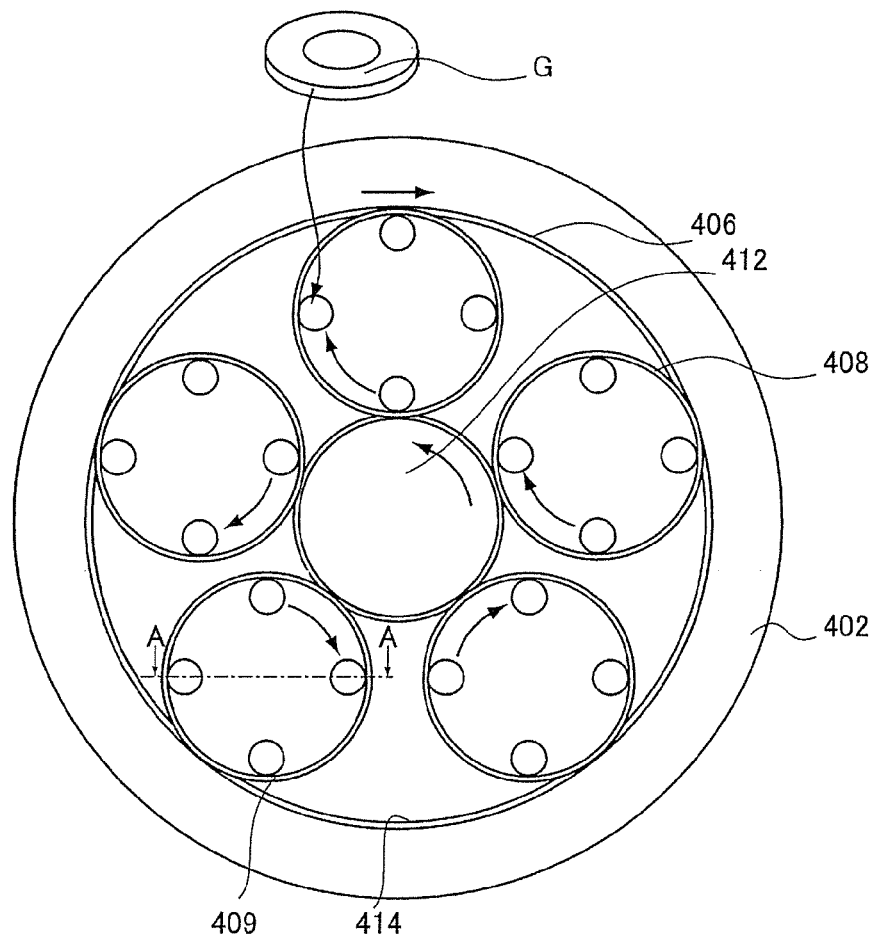
FIG. 9B is a view illustrating a carrier used in the apparatus of FIG. 9A.
Figure 10:
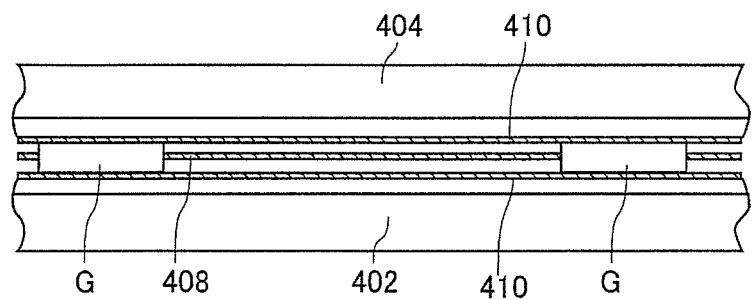
FIG. 10 is a view illustrating a state in which a sheet glass material is ground with the apparatus of FIG. 9A.

FIG. 9A is an overall view of an apparatus used to perform grinding, and FIG. 9B is a view illustrating a carrier used in the apparatus of FIG. 9A. FIG. 10 is a view illustrating the state in which the sheet glass material G is being ground.

As illustrated in FIG. 9A and FIG. 10, an apparatus 400 includes a lower surface plate 402, an upper surface plate 404, an internal gear 406, a carrier 408, a diamond sheet 410, a sun gear 412, an internal gear 414, a reservoir 416, and a coolant 418.

In the apparatus 400, the internal gear 406 is vertically sandwiched between the lower surface plate 402 and the upper surface plate 404. During the grinding, the plural carriers 408 are retained in the internal gear 406. In FIG. 9B, the five carriers 408 are retained. The surface of the diamond sheet 410 bonded to the lower surface plate 402 and the upper surface plate 404 in a planar manner constitutes a grinding surface. That is, the sheet glass material G is ground by the fixed abrasive grain in which the diamond sheet 410 is used.

As illustrated in FIG. 9B, the plural sheet glass materials G to be ground is retained while disposed in a circular hole made in each carrier 408. During the grinding, the pair of principal surfaces of the sheet glass material G abuts on the diamond sheet 410 while being sandwiched between the lower surface plate 402 and the upper surface plate 404.

On the other hand, the sheet glass material G is retained on the lower surface plate 402 by the carrier 408 that includes a gear 409 in an outer circumference. The carrier 408 engages the sun gear 412 and internal gear 414, which are provided in the lower surface plate 402. When the sun gear 412 is rotated in an arrow direction, each carrier 408 revolves around the sun gear 412 while rotating in an arrow direction as a planet gear. Therefore, the sheet glass material G is ground using the diamond sheet 410.

As illustrated in FIG. 9A, in the apparatus 400, a pump 420 supplies the coolant 418 in the reservoir 416 to the upper surface plate 404, and the pump 420 recovers the coolant 418 from the lower surface plate 402 to return the coolant 418 to the reservoir 416, thereby circulating the coolant 418. At this point, the coolant 418 removes swarf generated in the grinding from the grinding surface. Specifically, in the apparatus 400, when the coolant 418 is circulated, the filter 422 provided in the lower surface plate 402 filtrates the coolant 418 to retain the swarf in the filter 422.

Figure 11A:
FIG. 11A to FIG. 11D are views illustrating an example of a surface profile of the sheet glass material or glass substrate, which is obtained by grinding or polishing.
Figure 11B:

The principal surface has the surface profile illustrated in FIG. 11A by the grinding using the fixed abrasive grain. FIG. 11A is a view illustrating an example of the surface profile after the grinding using the fixed abrasive grain, and FIG. 11B is a view illustrating an example of the surface profile after the conventional grinding using the loose abrasive grain.

As illustrated in FIG. 11A, in the surface irregularity of the sheet glass material G, only the projected portion is effectively ground by the fixed abrasive grain, and the grinding surface becomes a profile shape in which a recessed portion and a crack are partially generated in a relatively flat portion. Obviously the relatively flat portion includes the irregularity having size corresponding to the particle size of the fixed abrasive grain, for example, the roughness. On the other hand, when the grinding is performed using the loose abrasive grain, the recessed portion is also removed in addition to the projected portion as illustrated in FIG. 11B. Therefore, after the grinding is performed using the loose abrasive grain, the flat surface does not become the surface profile illustrated in FIG. 11A in which the flat portion is relatively dominant.

The grinding performed using the fixed abrasive grain is not effective for the roughness of less than 0.01 µm of the surface irregularity. That is, the roughness of less than 0.01 µm is not ground by the fixed abrasive grain. Therefore, in order to effectively perform the grinding using the fixed abrasive grain, the roughness of the surface irregularity is adjusted to 0.01 µm or more in the formed sheet glass material G.

Figure 11C:
Figure 11D:

FIG. 11C is a view illustrating an example of the surface profile shape in which the grinding is easily performed using the fixed abrasive grain, while FIG. 11D is a view illustrating an example of the surface profile shape in which the grinding is hardly performed using the fixed abrasive grain.

As illustrated in FIG. 11C, when the projected portion locally exists in the surface profile while the roughness is 0.01 µm or more, the grinding is easily and effectively performed using the fixed abrasive grain. On the other hand, as illustrated in FIG. 11D, when the projected portion does not locally exist and there is a relatively smooth surface in the surface profile, the grinding is hardly performed using the fixed abrasive grain even if the roughness is 0.01 µm or more.

The difference of the surface profile shape can be expressed by the haze rate. That is, the sheet glass material G having the optical property in which the haze rate is 20% or more does not have the surface profile shape illustrated in FIG. 11D, and the grinding is hardly performed using the fixed abrasive grain. Therefore, the surface shapes of the inner circumferential surfaces 121a and 122a of the dies 121 and 122 are adjusted such that the formed sheet glass material G has the surface irregularity and the optical property. In this regard, as the optical property of the sheet glass material G according to the present embodiment, the haze rate is 20% is more.

In the grinding apparatus 400, the grinding is performed using the diamond sheet 410. Alternatively, the fixed abrasive grain in which the diamond particles are provided may be used instead of the diamond sheet 410. For example, a pellet that is formed by binding the diamond particles by a resin can be used in the grinding using the fixed abrasive grain.

(d) Edge Polishing Process

After the grinding is performed using the fixed abrasive grain, edge polishing is performed to the sheet glass material G (Step S50). In the edge polishing, mirror surface finishing is performed to an inner-circumferential-side end face and an outer-circumferential-side end face of the sheet glass material G by brush polishing. At this point, slurry that includes fine particles such as cerium oxide as the loose abrasive grain is used. The contamination of dust and damage such as a flaw are removed by performing the edge polishing. Therefore, generation of ions such as a sodium and potassium which cause corrosion can be prevented.

(e) First Polishing (Principal Surface Polishing) Process

The first polishing is performed to the ground principal surface of the sheet glass material G (Step S60). For example, the first polishing has the machining allowance of several micrometers to about 50 micrometers.

The first polishing is intended to remove the flaw left on the principal surface after the grinding using the fixed abrasive grain and the deformation. The apparatus 400 used in the grinding (Step S40) using the fixed abrasive grain is used in the first polishing. At this point, the first polishing differs from the grinding using the fixed abrasive grain in the following points:

the slurry of the turbid loose abrasive grain is used instead of the fixed abrasive grain;

the coolant is not used; and the resin polisher is used instead of the diamond sheet 410.

For example, the slurry of the turbid fine particles such as cerium oxide (particle size: diameter of about 1 μm to about 2 μm) is used as the loose abrasive grain used in the first polishing.

(f) Chemically Strengthening Process

After the first polishing, the sheet glass material G is chemically strengthened (Step S60).

For example, a mixed solution of potassium nitride (60%) and sodium sulfate (40%) can be used as a chemically strengthening solution. In the chemically strengthening, for example, the chemically strengthening solution is heated to 300° C. to 400° C., the washed sheet glass material G is pre-heated to 200° C. to 300° C., and the sheet glass material G is dipped in the chemically strengthening solution for three to four hours. Preferably, in order that the whole principal surfaces of the sheet glass material G are chemically strengthened, the dipping is performed while the plural sheet glass materials G are accommodated in a holder by retaining the sheet glass materials G at the end faces.

When the sheet glass material G is dipped in the chemically strengthening solution, the lithium ion and the sodium ion in the surface layer of the sheet glass material G are replaced by the sodium ion and the potassium ion which have relatively large ion radiuses in the chemically strengthening solution, respectively, thereby strengthening the sheet glass material G. The sheet glass material G to which the chemically strengthening treatment is performed is washed. For example, after washing the sheet glass material G using the sulfuric acid, the sheet glass material G is washed using pure water and IPA (isopropyl alcohol).

(g) Second Polishing (Final Polishing) Process

Then second polishing is performed to the sheet glass material G to which the chemically strengthening treatment and washing are sufficiently performed (Step S80). For example, the second polishing has the machining allowance of about 1 μm.

The second polishing is intended at the mirror surface polishing of the principal surface. The apparatus 400 that is used in the grinding (Step S40) using the fixed abrasive grain and the first polishing (Step S60) is used in the second polishing. At this point, the second polishing differs from the first polishing in the following points:

the kind and particle size of the loose abrasive grain, and hardness of the resin polisher.

For example, the slurry of the turbid fine particles such as colloidal silica (particle size: diameter of about 0.1 μm) is used as the loose abrasive grain used in the second polishing.

The polished sheet glass material G is then washed. A neutral detergent, pure water, and IPA are used in the washing.

The glass substrate for magnetic disk 2 having the surface irregularity, in which the flatness of the principal surface is 4 μm or less and the roughness of the principal surface is 0.2 nm or less, is obtained by the second polishing.

Then, as illustrated in FIG. 1, the layers 3A and 3B such as the magnetic layers are deposited on the glass substrate for magnetic disk 2 to prepare the magnetic disk 1.

The flow of the manufacturing method illustrated in FIG. 3 is described above. In the flow of FIG. 3, the scribing (Step S20) and the shape processing (Step S30) are performed between the grinding using the fixed abrasive grain (Step S40) and the first polishing (Step S60), and the chemically strengthening (Step S70) is performed between the first polishing (Step S60) and the second polishing (Step S80). However the sequence is not limited to the embodiment described above. As long as the grinding using the fixed abrasive grain (Step S40), the first polishing (Step S60), and the second polishing (Step S80) are performed in this order, the scribing (Step S20), the shape processing (Step S30), and the chemically strengthening (Step S70) may appropriately be replaced.

In the embodiment, the two-time grinding (first grinding and second grinding) using the loose abrasive grain is not performed to the formed sheet glass material G unlike the conventional method, but the first polishing and the second polishing is performed to the formed sheet glass material G after the one-time grinding is performed using the fixed abrasive grain. The reason the one grinding process can be omitted is that the sheet glass material, in which the principal surface has the target flatness as the glass substrate for magnetic disk, having the surface irregularity in which the roughness of the principal surface ranges from 0.1 μm to 10 μm and the optical property in which the haze rate is 20% or more can be formed.

Additionally, in the grinding using the fixed abrasive grain, as illustrated in FIG. 11A, only the projected portion in the surface profile can preferentially be ground, and the machining allowance can be suppressed in the first polishing and second polishing of the post-process. For example, the total of the machining allowances can be set to the range of 10 μm to 150 μm in the grinding and the polishing. Accordingly, preferably the sheet glass material G is formed thicker than the target thickness of the glass substrate 2 used in the magnetic disk by 10 μm to 150 μm, and the sheet glass material G is processed to the target thickness by the grinding and the polishing.

The machining allowance in the conventional grinding (first grinding process and second grinding process) and the polishing (first polishing process and second polishing process) exceeds 150 μm in order to resolve the low level of the flatness of the formed sheet glass material. That is, the machining allowance is set larger in the conventional first grinding process and second grinding process. When the sheet glass material G is largely ground in the conventional processes, the crack deeply proceeds while the flatness is improved. Therefore, the machining allowance is inevitably increased in the first polishing and the second polishing according to the conventional processes. The "roll-off problem" of the edge portion, in which the neighborhood of the outer circumferential edge portion is rounded in the glass substrate, is caused by the large machining allowance in the polishing according to the conventional processes. That the neighborhood of the outer circumferential edge portion is rounded is attributed to the fact that the hard or soft resin polisher is used in performing the first polishing and the second polishing.

In the method of the embodiment, the principal surface of the formed sheet glass material is ground using the fixed abrasive grain, and the first polishing can be performed to the ground principal surface of the sheet glass material. Therefore, in the method of the embodiment, the machining allowance can be decreased in the grinding, so that the machining allowance can be set to the range of 10 μm to 150 μm in the grinding, the first polishing, and the second polishing.

EXAMPLES, CONVENTIONAL EXAMPLE, AND COMPARATIVE EXAMPLES

Hereinafter, the effectiveness of the method illustrated in FIG. 3 was confirmed.

The alminosilicate glass (57 to 74% $SiO_2$, 0 to 2.8% $ZnO_2$, 3 to 15% $Al_2O_3$, 7 to 16% $LiO_2$, and 4 to 14% $Na_2O$) was used as the glass material.

The magnetic layer was formed on the prepared glass substrate using in-line type sputtering apparatus. Specifically, the CrTi adhesive layer, the CoTaZr/Ru/CoTaZr soft magnetic layer, the $CoCrSiO_2$ granular non-magnetic underlying layer, the CoCrPt—$SiO_2$.$TiO_2$ granular magnetic layer, and the carbon hydride protective layer were sequentially deposited on both the principal surfaces of the glass substrate. Then the perfluoropolyether lubricant layer was deposited on the deposited uppermost layer by a dipping method, thereby obtaining the magnetic disk.

Examples 1 to 11

The glass substrate was prepared by the method of the embodiment illustrated in FIGS. 3 to 5 using the sheet glass material having the surface irregularity in which the flatness of the principal surface was 4 μm or less and the roughness of the principal surface ranged from 0.01 μm to 10 μm and the optical property in which the haze rate was 20% or more.

Comparative Example 1

On the other hand, the glass substrate was prepared through Step S20 to Step S80 illustrated in FIG. 3 by the press forming illustrated in FIGS. 4 and 5 using the sheet glass material in which the roughness of the principal surface was lower than 0.01 μm while the flatness of the principal surface was 4 μm or less and the haze rate was 20% or more.

Comparative Examples 2 to 8

The glass substrate was prepared through Step S20 to Step S80 illustrated in FIG. 3 by the press forming illustrated in FIGS. 4 and 5 using the sheet glass material in which the flatness of the principal surface was 4 μM or less and the roughness of the principal surface ranged from 0.01 μm to 10 μm although the haze rate was lower than 20%.

Comparative Examples 9 to 11

The glass substrate was prepared through Step S20 to Step S80 illustrated in FIG. 3 by the press forming illustrated in FIGS. 4 and 5 using the sheet glass material in which the flatness of the principal surface was 4 μm or less, the roughness of the principal surface was more than 10 μm, and the haze rate was 20% or more.

Comparative Examples 12 to 14

The glass substrate was prepared through Step S20 to Step S80 illustrated in FIG. 3 by the press forming illustrated in FIGS. 4 and 5 using the sheet glass material in which the flatness of the principal surface was more than 4 μm, the roughness of the principal surface ranged from 0.01 μm to 10 μm, and the haze rate was 20% or more.

Conventional Example

The glass substrate was prepared using the sheet glass material prepared by the conventional method (method disclosed in Japanese Patent No. 3709033) (Conventional example). The first grinding, the second grinding, the first polishing, and the second polishing were performed such that the prepared glass substrate has the surface irregularity in which the flatness of the principal surface was 4 μm or less and the roughness of the principal surface was 0.2 nm or less.

The sheet glass materials of Examples 1 to 11 and Comparative examples 1 to 14 were prepared while the surface irregularity shape of the die used in the press forming was changed.

The conditions of the grinding and polishing of Examples 1 to 11 and Comparative examples 1 to 14 were set as follows:
- the grinding process using the fixed abrasive grain: diamond sheet,
- the first polishing process: cerium oxide (average particle size; diameter of 1 μm to 2 μm), the polishing was performed using a hard urethane pad, the machining allowance of 10 μm, and
- the second polishing process: colloidal silica (average particle size; diameter of 0.1 μm), the polishing was performed using a soft polyurethane pad, the machining allowance of 1 μm.

In Conventional example, the first grinding process and the second grinding process were performed as the grinding process using the loose abrasive grain. The conditions of the first polishing process and the second polishing process of Conventional example are identical to those of Examples 1 to 11 and Comparative examples 1 to 14.

The LUL (Load/Unload) endurance test (600000 times) was performed to evaluate floating stability of the magnetic head with respect to the obtained magnetic disk. The LUL endurance test is one that checks error occurrence, dirt of head after test, and abnormality generation such as abrasion by operating the HDD (hard disk device) in a cycle of lamp→ID stop→lamp→ID stop→ . . . while the HDD is placed in a thermo-hygrostat of 70° C. and 80%. After the LUL test of 80000 times/day×7.5 days=600000 times in which 10 HDDs was used for one experimental level, the test result was evaluated as fail when abnormality was generated even in one HDD.

Table 1 illustrates the roughness, flatness, haze rate of the principal surface in Examples 1 to 11 and Comparative examples 1 to 14 and the LUL endurance test result (pass or fail).

TABLE 1

| | Sheet glass material | | | Evaluation | | | |
|---|---|---|---|---|---|---|---|
| | Flatness (μm) | Roughness (μm) | Haze rate (%) | Possibility of grinding using fixed abrasive grain | Flatness after second polishing process (μm) | Possibility of adjustment to target plate thickness | LUL endurance test result |
| Example 1 | 3.91 | 0.013 | 20 | Possible | 3.88 | Possible | Pass |
| Example 2 | 3.33 | 0.088 | 20 | Possible | 3.15 | Possible | Pass |
| Example 3 | 2.71 | 0.166 | 25 | Possible | 2.65 | Possible | Pass |
| Example 4 | 3.45 | 0.289 | 20 | Possible | 3.58 | Possible | Pass |
| Example 5 | 1.56 | 0.563 | 30 | Possible | 1.92 | Possible | Pass |
| Example 6 | 0.77 | 0.721 | 25 | Possible | 0.83 | Possible | Pass |

TABLE 1-continued

|  | Sheet glass material | | | Evaluation | | | |
| --- | --- | --- | --- | --- | --- | --- | --- |
|  | Flatness (μm) | Roughness (μm) | Haze rate (%) | Possibility of grinding using fixed abrasive grain | Flatness after second polishing process (μm) | Possibility of adjustment to target plate thickness | LUL endurance test result |
| Example 7 | 0.89 | 0.981 | 20 | Possible | 0.91 | Possible | Pass |
| Example 8 | 2.55 | 1.034 | 20 | Possible | 2.49 | Possible | Pass |
| Example 9 | 3.96 | 1.362 | 35 | Possible | 3.87 | Possible | Pass |
| Example 10 | 0.53 | 2.071 | 20 | Possible | 0.51 | Possible | Pass |
| Example 11 | 0.41 | 9.723 | 35 | Possible | 0.40 | Possible | Pass |
| Comparative example 1 | 1.22 | 0.008 | 20 | Not possible | 1.32 | Not possible | Not tested |
| Comparative example 2 | 1.58 | 0.011 | 5 | Not possible | 1.55 | Not possible | Not tested |
| Comparative example 3 | 2.41 | 0.057 | 10 | Not possible | 2.52 | Not possible | Not tested |
| Comparative example 4 | 2.22 | 0.065 | 5 | Not possible | 2.31 | Not possible | Not tested |
| Comparative example 5 | 1.38 | 0.096 | 15 | Not possible | 1.43 | Not possible | Not tested |
| Comparative example 6 | 1.56 | 0.664 | 15 | Not possible | 1.66 | Not possible | Not tested |
| Comparative example 7 | 1.50 | 0.998 | 15 | Not possible | 1.55 | Not possible | Not tested |
| Comparative example 8 | 1.22 | 2.562 | 15 | Not possible | 1.18 | Not possible | Not tested |
| Comparative example 9 | 0.81 | 10.39 | 40 | Possible | 0.75 | Possible | Fail |
| Comparative example 10 | 0.64 | 11.34 | 40 | Possible | 0.55 | Possible | Fail |
| Comparative example 11 | 3.04 | 13.33 | 35 | Possible | 3.11 | Possible | Fail |
| Comparative example 12 | 4.14 | 0.088 | 20 | Possible | 4.18 | Possible | Fail |
| Comparative example 13 | 5.81 | 0.077 | 20 | Possible | 5.99 | Possible | Fail |
| Comparative example 14 | 7.63 | 0.083 | 20 | Possible | 8.15 | Possible | Fail |

As is clear from the comparison of Examples 1 to 11 and Comparative examples 1 to 14 in Table 1, as long as the formed sheet glass material has the surface irregularity in which the flatness of the principal surface is 4 μm or less and the roughness of the principal surface ranges from 0.01 μm to 10 μm and the optical property in which the haze rate is 20% or more, the LUL endurance test can be performed, and the sheet glass material passes the LUL endurance test.

In Examples 8 to 11 and Comparative examples 8 to 11, because the roughness of the principal surface of the sheet glass material G exceeded 1.0 μm when the press forming was performed, the scribing process was not able to be performed. Therefore, the coring was performed with the core drill instead of the scribing process.

In Examples 1 to 11, the thickness of the sheet glass material G in the press forming was larger than the target thickness of the glass substrate 2 by 10 μm to 150 μm, and the thickness of 10 μm to 150 μm was removed by the grinding and the polishing, whereby the glass substrate with the target thickness including the surface irregularity that passes the LUL endurance test was able to be prepared.

In Conventional example formed by the conventional method, the thickness of the sheet glass material was set larger than the target thickness of the glass substrate 2 by 150 μm, and the thickness of 150 μm was removed by the grinding and the polishing, whereby the glass substrate with the target thickness was able to be obtained. However, it was observed that the neighborhood of the outer circumferential edge portion of the magnetic disk in which the glass substrate of Conventional example was used was rounded, which causes the "roll-off problem".

As described above, the formed sheet glass material has the surface irregularity, in which the flatness of the principal surface is 4 μm or less and the roughness of the principal surface ranges from 0.01 μm to 10 μm, and the optical property in which the haze rate is 20% or more. Therefore, it is found that the grinding is effectively performed using the fixed abrasive grain. At this point, "the flatness of the principal surface is 4 μm or less" means the target flatness of the principal surface in the glass substrate for magnetic disk.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alternations could be made hereto without departing from the spirit and scope of the invention.

What is claimed is:

1. A manufacturing method of glass substrate for a magnetic disk, the method comprising:
    operating a cutting unit to cut molten glass flowing out from a molten glass outflow port to form a lump of the molten glass that is separated from the molten glass flowing out from the molten glass outflow port;
    after the operating of the cutting unit, operating a first die and a second die to move horizontally toward each other to form a sheet glass material by performing press forming from both sides of a falling path of the lump as the lump is falling to catch and spread the lump along an inner circumferential surface of the first die and an inner circumferential surface of the second die, and maintaining the first die and the second die proximate to each other to retain the lump spread along the inner circumferential surface of the first die and the inner circumferential surface of the second die until the lump is cooled to become the sheet glass material, such that the sheet glass material has a surface shape to be ground using a fixed abrasive grain;

grinding the principal surface of the sheet glass material using the fixed abrasive grain; and polishing the sheet glass material using a loose abrasive grain, such that the sheet glass material is polished into the glass substrate including a principal surface having a target flatness for the magnetic disk.

2. The manufacturing method of glass substrate for a magnetic disk according to claim 1, wherein the sheet glass material is formed thicker than a target thickness of the glass substrate for magnetic disk by 10 µm to 150 µm, and
the sheet glass material is processed to the target thickness by the grinding and the polishing.

3. The manufacturing method of glass substrate for a magnetic disk according to claim 1, wherein
the first and second dies are set to substantially same temperature.

4. The manufacturing method of glass substrate for a magnetic disk according to claim 3, wherein the first and second dies are opened immediately after the press forming is performed to the lump while the lump is sandwiched between the surfaces of the first and second dies in the forming of the sheet glass material.

5. The manufacturing method of glass substrate for a magnetic disk according to claim 1, wherein the grinding is performed using a diamond sheet in which diamond particles are provided in the grinding.

6. The manufacturing method of glass substrate for a magnetic disk according to claim 1, further comprising scribing the sheet glass material between the forming of the sheet glass material and the grinding.

7. The manufacturing method of glass substrate for a magnetic disk according to claim 6, wherein the principal surface of the sheet glass material has roughness of 0.01 µm to 1 µm.

8. The manufacturing method of glass substrate for a magnetic disk according to claim 1, wherein the target flatness is 4 µm or less.

9. The manufacturing method of glass substrate for a magnetic disc according to claim 1, wherein a temperature of each of the first and second dies is retained lower than a temperature of the molten glass.

10. A manufacturing method of glass substrate for a magnetic disk, the method comprising:

operating a cutting unit to cut molten glass flowing out from a molten glass outflow port to form a lump of the molten glass that is separated from the molten glass flowing out from the molten glass outflow port;

after the operating the cutting unit, operating a first die and a second die to move horizontally toward each other to form a sheet glass material by performing press forming from both sides of a falling path of the lump as the lump is falling to catch and spread the lump along an inner circumferential surface of the first die and an inner circumferential surface of the second die, and maintaining the first die and the second die proximate to each other to retain the lump spread along the inner circumferential surface of the first die and the inner circumferential surface of the second die until the lump is cooled to become the sheet glass material, such that the sheet glass material has a surface irregularity in which roughness of the principal surface ranged from 0.01 µm to 10 µm and an optical property in which a haze rate is 20% or more;

grinding the principal surface of the sheet glass material using a fixed abrasive grain; and polishing the sheet glass material using a loose abrasive grain, such that the sheet glass material is polished into the glass substrate including a principal surface having a target flatness for the magnetic disk.

11. The manufacturing method of glass substrate for a magnetic disk according to claim 10, wherein
the sheet glass material is formed thicker than a target thickness of the glass substrate for magnetic disk by 10 µm to 150 µm, and
the sheet glass material is processed to the target thickness by the grinding and the polishing.

12. The manufacturing method of glass substrate for a magnetic disk according to claim 10, wherein
the first and second dies are set to substantially same temperature.

13. The manufacturing method of glass substrate for a magnetic disk according to claim 12, wherein the first and second dies are opened immediately after the press forming is performed to the lump while the lump is sandwiched between the surfaces of the first and second dies in the forming of the sheet glass material.

14. The manufacturing method of glass substrate for a magnetic disk according to claim 10, wherein the grinding is performed using a diamond sheet in which diamond particles are provided in the grinding.

15. The manufacturing method of glass substrate for a magnetic disk according to claim 10, further comprising scribing the sheet glass material between the forming of the sheet glass material and the grinding.

16. The manufacturing method of glass substrate for a magnetic disk according to claim 15, wherein the principal surface of the sheet glass material has roughness of 0.01 µm to 1 µm.

17. The manufacturing method of glass substrate for a magnetic disk according to claim 10, wherein the target flatness is 4 µm or less.

18. The manufacturing method of glass substrate for a magnetic disc according to claim 10, wherein a temperature of each of the first and second dies is retained lower than a temperature of the molten glass.

19. A manufacturing method of a glass substrate for a magnetic disk, the method comprising:

cutting molten glass flowing out from a molten glass outflow port into a cut lump using a cutting unit, such that the cut lump falls along a lump falling path;

sandwiching, after cutting the molten glass, the cut lump between a first die including a first inner circumferential surface and a second die including a second inner circumferential surface while the cut lump falls along the lump falling path, the first die and the second die facing each other horizontally, the cut lump being caught and spread along the first inner circumferential surface and the second inner circumferential surface;

keeping the first die and the second die in close contact until the cut lump spread along the first inner circumferential surface and the second inner circumferential surface is cooled to form a sheet glass material including a principal surface, such that the sheet glass material has a surface shape to be ground using a fixed abrasive grain;

grinding the principal surface of the sheet glass material using the fixed abrasive grain; and polishing the sheet glass material using a loose abrasive grain, such that the sheet glass material is polished into the glass substrate including a principal surface having a target flatness for the magnetic disk.

* * * * *